No. 707,344. Patented Aug. 19, 1902.
D. NEALE.
BURGLAR PROOF SAFE.
(Application filed Nov. 19, 1901.)
(No Model.)
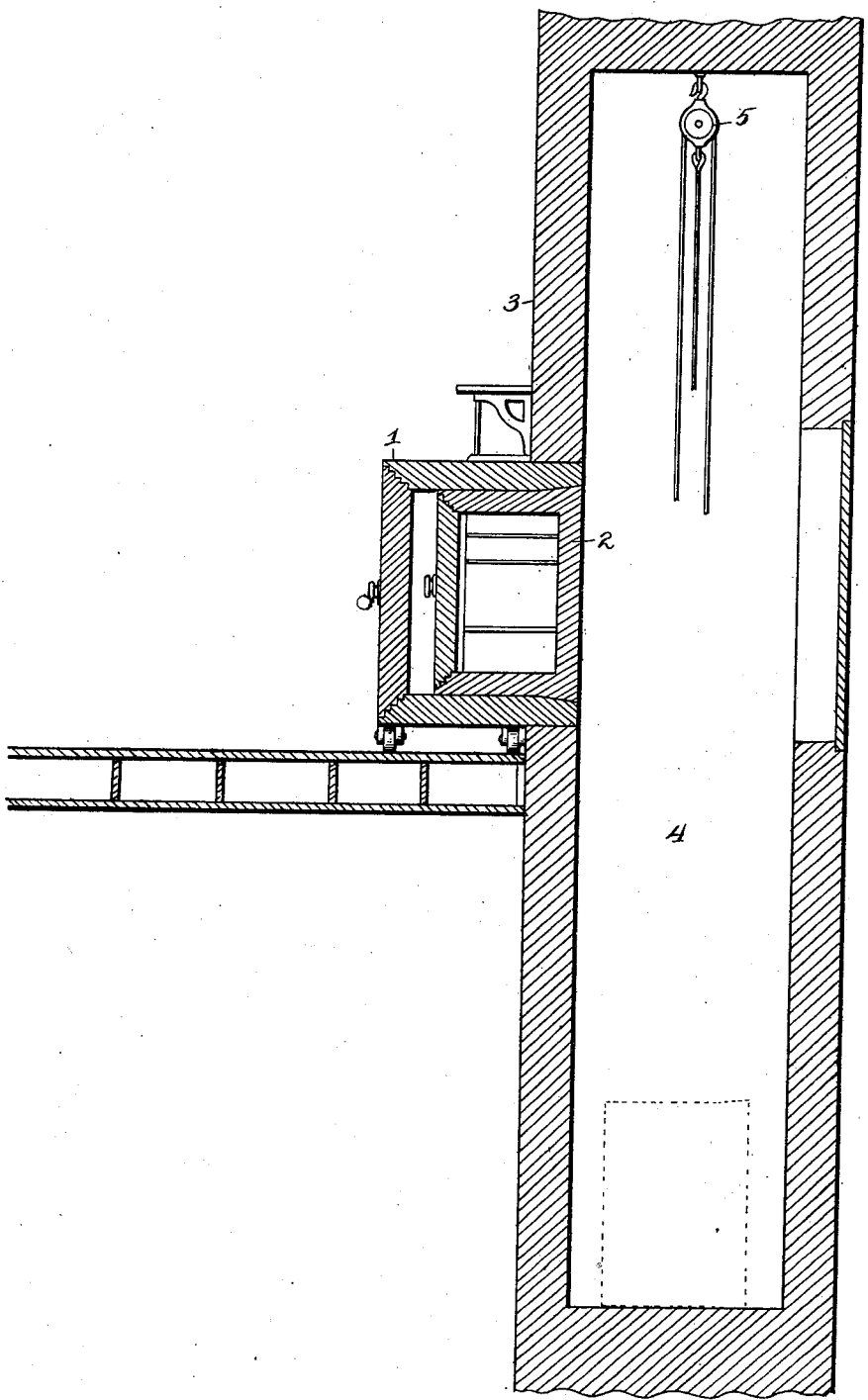
Witnesses:
Alfred W Eickes
Frank Turner
Inventor
David Neale
by Higdon & Longan Attys.

UNITED STATES PATENT OFFICE.

DAVID NEALE, OF FORT CALHOUN, NEBRASKA.

BURGLAR-PROOF SAFE.

SPECIFICATION forming part of Letters Patent No. 707,344, dated August 19, 1902.

Application filed November 19, 1901. Serial No. 82,931. (No model.)

*To all whom it may concern:*

Be it known that I, DAVID NEALE, of the city of Fort Calhoun, Washington county, State of Nebraska, have invented certain new and useful Improvements in Burglar-Proof Safes, of which the following is a full, clear, and exact description, reference being had to the accompanying drawing, forming a part hereof.

This invention relates to burglar-proof safes; and it consists in the novel arrangement, construction, and combination of parts, as will be fully hereinafter described, and set forth in the claim.

The object of this invention is to construct a safe and devise a system whereby a safe is perfectly burglar-proof by disappearing in a pit when the same is tampered with by means of dynamite and the like.

The drawing is a sectional view illustrating my invention.

In the construction of the device as shown I provide a safe which consists of the ordinary outer burglar-proof casing 1, with the rear thereof open. Within this casing I provide a second casing 2, held loosely therein. The rear portion of the casing 1, containing the second casing, is built within the wall 3 of a building, and to the rear thereof is arranged a pit or well 4. The purpose of this well is to allow the second casing 2 to fall therein in case the safe is drilled and exploded by the usual method, and it is a well-known fact that by the use of explosives the weakest point of such a device will yield. If, for example, the safe should be drilled and the explosive placed therein, the concussion caused by the explosion will force the second casing 2 outwardly into the pit 4, entirely out of reach of the burglars. The pit is so arranged that should the safe be burglarized it will be necessary in order to replace the safe in position within the outer casing to raise it by means of a block and tackle, such as indicated by 5. The second casing 2 contains all of the money-drawers and paper-pigeonholes, and when the same is forced into the pit all of its contents is carried with it. In arranging my device in a building I may design it in a fanciful configuration, so as to deceive its construction. The falling of the second casing will create an alarm throughout the building and cause the burglars, if not captured, to be frightened away.

I claim—

A safe of the class described composed of a casing having its rear side open; a second casing located within the first-mentioned casing and inserted through the rear side, and a pit located to the rear of the safe for receiving the second-mentioned casing when an attempt has been made to explode the safe, substantially as specified.

In testimony whereof I affix my signature in presence of two witnesses.

DAVID NEALE.

Witnesses:
ALFRED A. EICKS,
FRANK TURNER.